United States Patent [19]

Hara

[11] Patent Number: 4,729,104
[45] Date of Patent: Mar. 1, 1988

[54] METHOD AND APPARATUS FOR VEHICLE SPEED CONTROL

[75] Inventor: Toshiaki Hara, Zama, Japan

[73] Assignee: Nissan Motor Company, Limited, Kanagawa, Japan

[21] Appl. No.: 865,828

[22] Filed: May 22, 1986

[30] Foreign Application Priority Data

May 28, 1985 [JP] Japan ................................ 60-113186

[51] Int. Cl.$^4$ ............................................ B60K 31/00
[52] U.S. Cl. .................................... 364/426; 123/352; 123/361; 180/179
[58] Field of Search .................... 364/426, 431.07, 565; 123/352, 361, 376; 180/179

[56] References Cited

U.S. PATENT DOCUMENTS

| 3,580,355 | 5/1971 | Kitano et al. | 123/352 |
| 3,727,714 | 4/1973 | Ishikawa | 123/352 |
| 3,804,193 | 4/1974 | Ikuta | 123/352 |
| 3,893,537 | 7/1975 | Sakakibara | 123/352 |
| 4,190,026 | 2/1980 | Sakakibara | 123/352 |
| 4,374,422 | 2/1983 | O'Keefe, Jr. et al. | 123/352 |
| 4,419,729 | 12/1983 | Krieder | 123/352 |
| 4,495,454 | 1/1985 | Collonia | 318/663 |
| 4,577,718 | 3/1986 | Ueno | 123/361 |
| 4,591,986 | 5/1986 | Nakajima et al. | 364/426 |
| 4,598,370 | 7/1986 | Nakajima et al. | 364/426 |

FOREIGN PATENT DOCUMENTS 0051004  5/1982 European Pat. Off. .
2141269 12/1984 United Kingdom .

Primary Examiner—Gary Chin
Attorney, Agent, or Firm—Schwartz, Jeffery, Schwaab, Mack, Blumenthal & Evans

[57] ABSTRACT

Method and apparatus for controlling an automotive vechicle having an accelerator pedal, a throttle valve, and an actuator for moving said throttle valve in response to a control signal. Actual values of vehicle travelling speed and throttle valve position are sampled at time intervals to determine a running characteristic which defines throttle valve position in relation to vehicle travelling speed. The value of the control signal is determined from the determined running characteristic in accordance with a vehicle travelling speed demand value in a manner to maintain the vehicle travelling speed at the demand value.

8 Claims, 2 Drawing Figures

METHOD AND APPARATUS FOR VEHICLE SPEED CONTROL

BACKGROUND OF THE INVENTION

This invention relates to a method and apparatus for controlling the speed of travelling of an automotive vehicle and, more particularly, to a vehicle speed control method and apparatus for maintaining the vehicle speed at a demand value when an operator's demand occurs.

As well known in the art, vehicle speed automatic control apparatus include a control circuit which provides a feedback control signal containing integral plus proportional terms generated in response to the sensed deviation of the vehicle travelling speed from a demand speed. This feedback control signal is utilized by a throttle valve actuator to adjust the throttle valve position in a sense and direction to correct the vehicle speed deviation.

In order to improve the control characteristic of the vehicle speed automatic control apparatus, it is required to increase the speed of response to occurrence of a deviation between the demand and actual vehicle speeds and also to minimize the tendency toward hunting which results in repeated deviation of the vehicle travelling speed from the demand value in a short time. It is understood, of course, that the control characteristic is greatly dependent on the vehicle running characteristic which differs from one vehicle type to another.

In recent years, many of such vehicle speed control apparatus employ a large scale integrated circuit (LSI circuit) forming therein a digital computer for calculating the value of the control signal applied to the throttle valve actuator. In order to produce such large scale integrated circuits on a mass production basis at remarkably low cost, it is particularly desirable that they are applicable for various types of vehicle. However, the large scale integrated circuits should be produced to match with respective vehicle running characteristics which differ from one vehicle type to another. For the same type of vehicle, the running characteristic is affected by changes in various factors including engine performance, running resistance, transmission loss, and transmission gear ratio. The engine performance changes with the lapse of time. The running resistance changes with changes in loaded weight and tire air pressure.

Therefore, it is the problem in the art to provide a vehicle speed control apparatus applicable commonly in various types of vehicle without any degradation in control stability and response speed.

SUMMARY OF THE INVENTION

There is provided, in accordance with the present invention, a method of controlling a vehicle having an internal combustion engine, an accelerator pedal, a throttle valve, and an actuator responsive to a control signal for moving the throttle valve. The method includes generating a first electrical signal indicative of the speed of travelling of the vehicle and generating a second electrical signal indicative of the degree of opening of the throttle valve. The actual values of vehicle travelling speed and throttle valve position are sampled at time intervals in determining a running characteristic which defines throttle valve position in relation to vehicle travelling speed. A demand value for the vehicle travelling speed is detected. The method also includes determining a value corresponding to the control signal from the determined running characteristic in accordance with the detected vehicle travelling speed demand value, thereby maintaining the vehicle at the demand travelling speed.

In another aspect of the invention, there is provided an apparatus for use with a vehicle having an internal combustion engine, an accelerator pedal, and a throttle valve for controlling the speed of rotation of the engine. The apparatus comprises a first signal source for generating a first electrical signal indicative of the speed of travelling of the vehicle and a second signal source for generating a second electrical signal indicative of the degree of opening of the throttle valve, and a control circuit responsive to the first and second electrical signals for generating a control signal. The control circuit includes means for sampling actual values of vehicle travelling speed and throttle valve position at time intervals to determine a running characteristic which defines throttle valve position in relation to vehicle travelling speed. The control circuit also includes means for detecting a demand value of vehicle travelling speed and means for determining a value corresponding to the control signal from the determined running characteristic in accordance with the detected vehicle travelling speed demand value. An actuator controls the throttle valve to maintain the vehicle at the demand travelling speed in response to the control signal.

BRIEF DESCRIPTION OF THE DRAWINGS

The present invention will be described in greater detail by reference to the following description taken in connection with the accompanying drawings, in which.

DETAILED DESCRIPTION OF THE PREFERRED EMBODIMENTS

Figure 1:
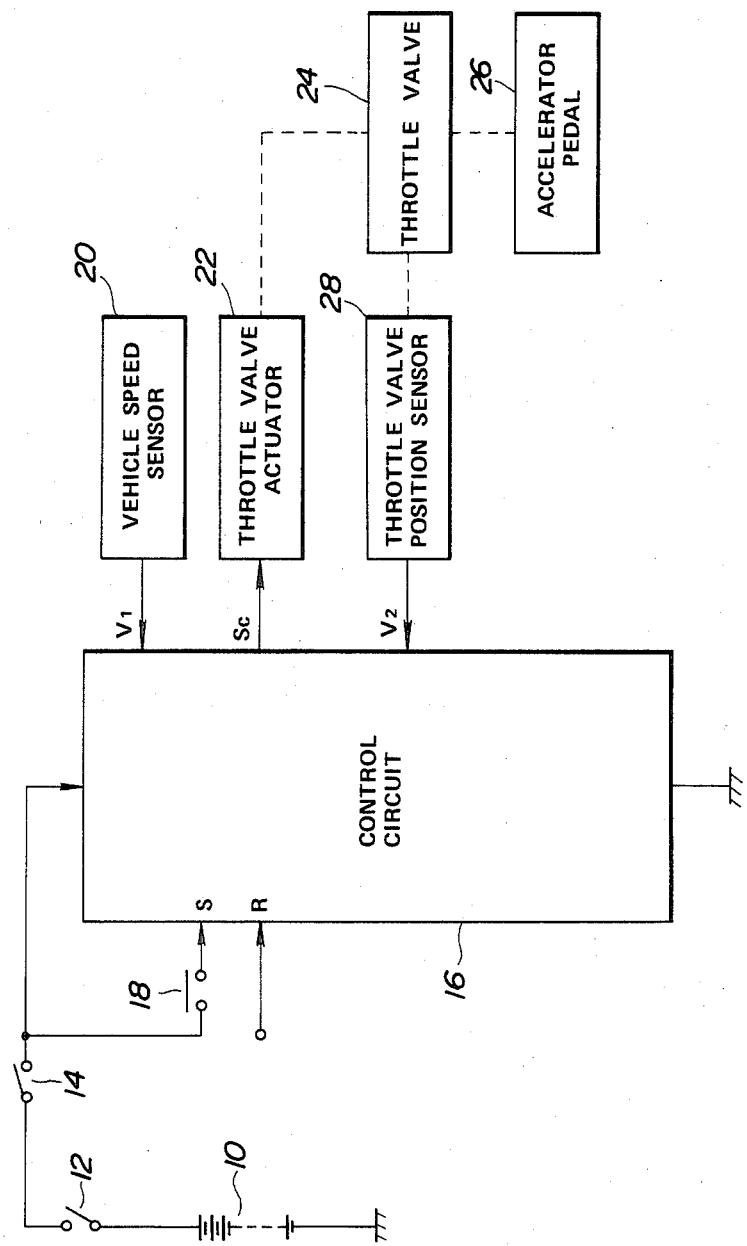
FIG. 1 is a schematic diagram showing one embodiment of a vehicle speed control apparatus made in accordance with the present invention.

With reference to the drawings and in particular to FIG. 1, there is shown a schematic block diagram of an automotive vehicle speed control apparatus embodying the present invention. In FIG. 1, the reference numeral 24 designates a variable positionable throttle valve which is mounted as for rotation with a throttle shaft within an air induction passage for controlling the flow of air to the engine so as to adjust the speed of rotation of the engine. The throttle valve 24 is moved selectively by an accelerator pedal 26 or a throttle valve actuator 22. In a manual control mode, the accelerator pedal 26 is drivingly associated with the throttle valve 24 to move the throttle valve with the movement of the accelerator pedal. In an automatic control mode, the throttle valve actuator 22 is drivingly associated with the throttle valve 24 to move the throttle valve in a manner to maintain the automotive vehicle at a constant travelling speed. The throttle valve actuator 22 is electrically controlled and it determines the setting of the throttle valve 24 which, in turn, determines the amount of air admitted to the engine. A throttle valve position sensor 28 generates a signal V2 corresponding to the degree of opening of the throttle valve 28. The throttle valve position sensor 28 may include a potentiometer which has a wiper arm drivingly connected to the throttle shaft for generating a voltage signal corresponding to the degree of opening of the throttle valve 24. A vehicle speed sensor 20 generates a signal V1 corresponding to the speed of travelling of the automotive vehicle.

The sensor signals V1 and V2 are applied to a control circuit 16. The control circuit 16 is powered from a standard vehicle battery 10 through a series circuit of an ignition switch 12 and a power switch 14. The control circuit 16 receives a set signal S from a set signal generator. The set signal generator may include a set switch 18 which is manually closed to supply current from the vehicle battery 10 so as to change the set signal S from a logic 0 level to a logic 1 level. The control circuit 16 operates in an automatic control mode to maintain the automotive vehicle at a demand or target travelling speed when the set signal S is at the logic 1 level. The control circuit 16 also receives a reset signal R from a reset signal generator. The reset signal generator changes the reset signal R from a logic 0 level to a logic 1 level when the accelerator pedal 26 is released or depressed. The reset signal generator may include a brake switch which is responsive to the application of braking to the vehicle to close to supply current from the vehicle battery 10 so as to change the reset signal R from the logic 0 level to the logic 1 level. The brake switch is effective to detect when the accelerator pedal is released. The control circuit 16 changes its operation from the automatic control mode to the manual control mode when the reset signal R changes to the logic 1 level. In the manual control mode, where the throttle valve 24 is moved in response to movement of the accelerator pedal 26, the control circuit 16 samples actual values of vehicle travelling speed and throttle valve position at time intervals to determine a running characteristic which defines throttle valve position in relation to vehicle travelling speed.

In the automatic control mode, the control circuit 16 produces a control signal Sc to the throttle valve actuator 22 for controlling the position of the throttle valve 24 in a manner to maintain the automotive vehicle at a demand travelling speed. For this purpose, the control circuit determines a value corresponding to the control signal from the determined running characteristic in accordance with a demand value for vehicle travelling speed.

The control circuit 16 may employ an LSI circuit (large scale integrated circuit) forming therein a digital computer which shall be regarded as including an analog-to-digital converter, a central processing unit, a memory, a timer, and a digital-to-analog converter. The analog-to-digital converter, a central processing unit, a memory, a timer, and a digital-to-analog converter. The analog-to-digital converter receives the analog signal V2 from the throttle-valve position sensor 28 and converts it into a corresponding digital signal for application to the central processing unit. The memory contains the program for operating the central processing unit and further contains appropriate data in look-up tables used in calculating appropriate values for the position of the throttle valve 24. The look-up table may be obtained experimentally or derived empirically. The central processing unit may be programmed in a known manner to interpolate between the data at different entry points if desired. Control words specifying a desired throttle valve position are periodically transferred by the central processing unit to the digital-to-analog converter. The digital-to-analog converter converts the transferred information into analog form and applies a control signal to the throttle actuator 22 for controlling the position of the throttle valve 24.

Figure 2:
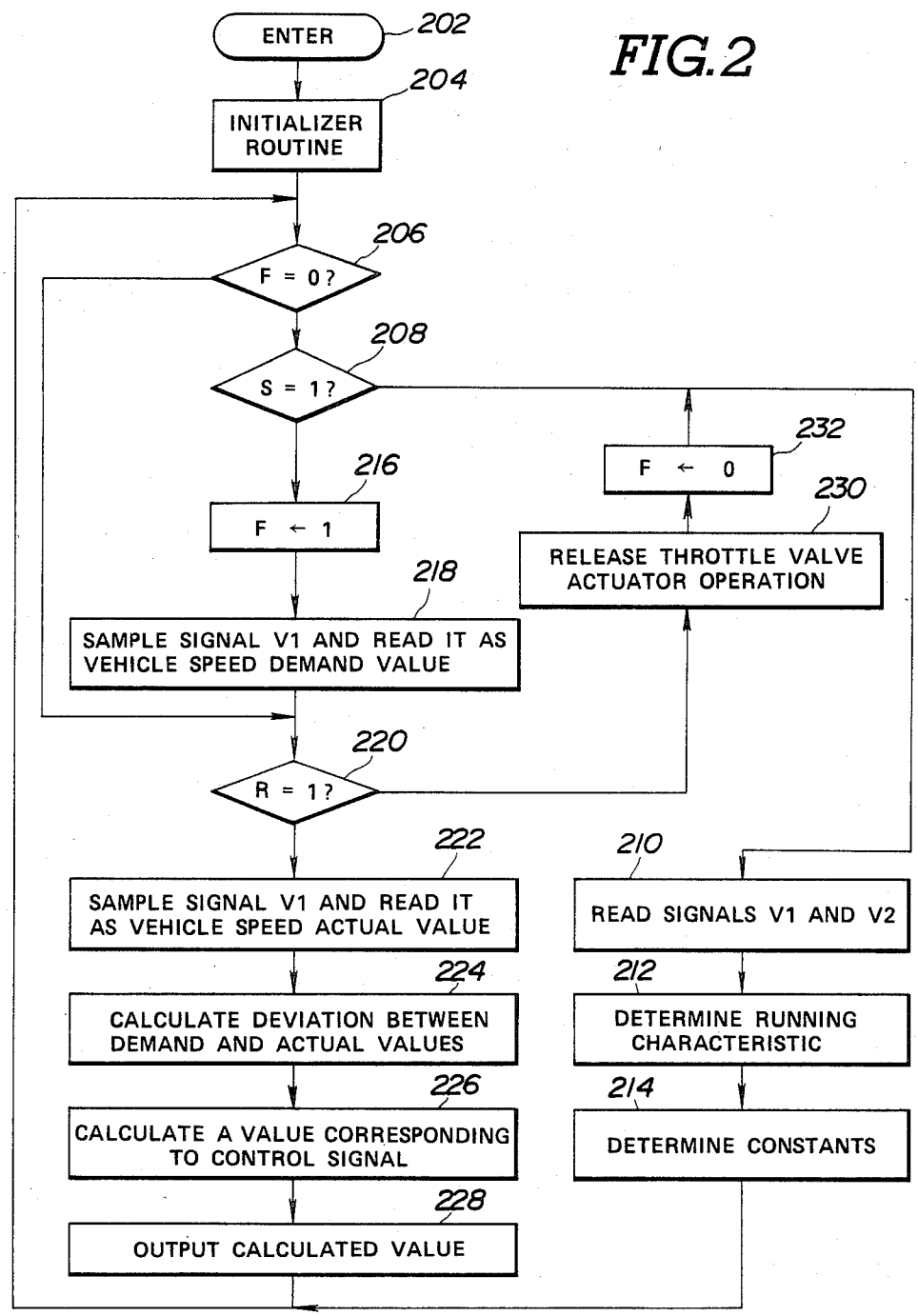
FIG. 2 is a flow diagram illustrative of the operation of the digital computer used in the control circuit of FIG. 1.

FIG. 2 is a flow diagram of the programming of the digital computer used in the control circuit 16. The computer program is entered at the point 202 when the power switch 14 is turned on to apply power to the control circuit 16. At the point 301 in the program, the control circuit components are initialized. This initializer routine includes placing the throttle valve actuator 22 out of operation and resetting a flag F to zero. At the point 206, a determination is as to whether or not the flag F is zero. If the answer to this question is "yes", then the program proceeds to another determination point 208. This determination is as to whether or not the set signal S is at the logic 1 level. If the answer to this question is "yes", then it means that the set switch 18 is open and the program proceeds to the point 210. At the point 210 in the program, the signals V1 and V2 are read into the computer memory. At the point 212, the central processing unit determines a running characteristic from the sampled values for vehicle speed and throttle valve position, the running characteristic defining throttle valve position as a function of vehicle travelling speed. At the point 214, the central processing unit analizes the determined running characteristic to determine constant K1 and K2 used in calculating a value corresponding to the control signal Sc. Following this, the program returns to the point 206.

As long as the set switch 18 remains open to operate the control circuit 16 in the manual control mode, these routines are repeated to sample the actual values for vehicle travelling speed and throttle valve position at time intervals and use the sampled data so as to determine a running characteristic or a relationship which defines throttle valve position in relation to vehicle travelling speed. This running characteristic is analized to determine constants K1 and K2 used in calculating a value corresponding to the control signal Sc.

To operate the control circuit 16 in the automatic control mode so as to maintain the automotive vehicle at a demand speed set by the depression of the accelerator pedal 26, he may close the set switch 18. This operation causes a change of the set signal S from the logic 0 level to the logic 1 level. Consequently, the program proceeds from the point 208 to the point 216 where the flag F is set to 1. At the point 218 in the program, the signal V1 is sampled and read, as a vehicle travelling speed demand value Vo, into the computer memory. Following this, the program proceeds to the point 220 where a determination is made as to whether or not the reset signal R is at the logic 1 level. If the answer to this question is "no", then the program proceeds to the point 222 where the signal V1 is read, as a vehicle travelling speed actual value V, into the computer memory. At the point 224 in the program, the central processing unit calculates a deviation between the demand and actual values of vehicle travelling speed. At the point 226, the central processing unit calculates a value corresponding to the control signal SC required to bring the throttle valve 24 to a new setting so as to adjust the speed of rotation of the engine in a direction zeroing the deviation $\Delta V$. The value is calculated as $K1 \times (\Delta V + K2 \int \Delta V \, dt)$ where $\Delta V$ is the calculated deviation and K1 and K2 are constants calculated at the point 214 in the program. It is to be understood that the constant K1 corresponds to the proportional gain of an integral-plus-proportional control circuit (IP control circuit) and the constant K2 corresponds to the integral gain thereof.

At the point 228 in the program, the calculated new setting information is transferred to the digital-to-analog converter which thereby produces a control signal Sc to the throttle valve actuator 22 for moving the throttle valve 22 to the new setting so as to reduce the deviation ΔV to zero. Following this, the program returns to the point 206. Since the flag F has been set at 1 at the point 216 in the previous program execution cycle, the program proceeds from the point 206 to the point 220. The program proceeds through the points 222, 224, 226 and 228 repetitively at time intervals to provide feedback control of the vehicle travelling speed to the demand value Vo.

To change the control circuit 16 from the automatic control mode to the manual control mode, the operator may depress the brake pedal or the accelerator pedal 26. This operation causes a change of the reset signal R from the logic 0 level to the logic 1 level. As a result, the program proceeds from the point 220 to the point 230 where the operation of the throttle valve actuator 22 is released. This releasing operation permits movement of the throttle valve 24 with movement of the accelerator pedal 26. At the point 232 in the program, the flag F is reset to zero. Following this, the program returns to the point 210.

According to the present invention, the vehicle travelling speed is adjusted under proportional plus integral control using proportional and integral gains determined from a running characteristic detected from actual values of throttle valve position and vehicle travelling speed sampled during vehicle travelling. It is, therefore, possible to use the vehicle speed control method and apparatus commonly for various types of vehicle without any degradation in control stability and response speed. In addition, since the running characteristic is determined from latest values of throttle valve position and vehicle travelling speed sampled just before the control circuit is changed into the automatic control mode, the control accuracy is independent of transmission gear ratio and/or loaded weight changes.

Although the control signal is derived from a deviation between demand and actual values of vehicle travelling speed under proportional plus integral control, it is to be noted that the control signal may be derived from a higher level calculation. In addition, although the control circuit determines the constants for use in calculating a value corresponding to the control signal Sc from a running characteristic derived from values of vehicle travelling speed and throttle valve position sampled in a manual control mode, it is to be noted that the control circuit may be arranged to perform the operation of determining the constants in an automatic control mode.

While a preferred embodiment of the invention has been shown and described, various other embodiments and modifications thereof will be apparent to those skilled in the art, and will fall within the scope of this invention as defined in the following claims.

What is claimed is:

1. A method of controlling a vehicle having an internal combustion engine, an accelerator pedal, a throttle valve, and an actuator responsive to a control signal for moving said throttle valve, comprising the steps of:
   generating a first electrical signal indicative of the speed of travelling of said vehicle;
   generating a second electrical signal indicative of the degree of opening of said throttle valve;
   repetitively sampling said first and second electrical signals to accumulate a number of sets of actual values of vehicle travelling speed and throttle valve position, the accumulated actual values specifying a running characteristic which defines throttle valve position in relation to vehicle travelling speed;
   detecting a demand value of vehicle travelling speed; and
   determining a throttle valve position value corresponding to said control signal from said running characteristic in accordance with said detected demand value of vehicle travelling speed, thereby maintaining said vehicle at said demand travelling speed.

2. The method as claimed in claim 1, wherein the step of determining a value corresponding to said control signal includes the steps of:
   calculating a deviation between the demand and actual values of vehicle travelling speed; and
   calculating said value corresponding to said control signal as a function of said calculated deviation, said function being derived from said determined running characteristic, thereby zeroing said deviation.

3. The method as claimed in claim 1, wherein the step of determining a value corresponding to said control signal includes the steps of:
   determining constants K1 and K2 from said determined running characteristic;
   calculating a deviation ΔV between the demand and actual values of vehicle travelling speed; and
   calculating said value corresponding to said control signal as $K1 \times (\Delta V + K2 \int \Delta V \, dt)$.

4. The method as claimed in claim 1, wherein the step of detecting a demand value of vehicle travelling speed includes the steps of:
   generating a set signal;
   sampling an actual value of vehicle travelling speed in response to said set signal; and
   setting said vehicle travelling speed demand value at said actual value sampled substantially upon generation of said set signal.

5. An apparatus for use with a vehicle having an internal combustion engine, an accelerator pedal, and a throttle valve for controlling the speed of rotation of said engine, comprising:
   a first signal source for generating a first electrical signal indicative of the speed of travelling of said vehicle;
   a second signal source for generating a second electrical signal indicative of the degree of opening of said throttle valve;
   a control circuit responsive to said first and second electrical signals for generating a control signal, said control circuit including means for repetitively sampling said first and second electrical signals to accumulate a number of sets of actual values of vehicle travelling speed and throttle valve position, the accumulated actual values specifying a running characteristic which defines throttle valve position in relation to vehicle travelling speed, means for detecting a demand value of vehicle travelling speed, and means for determining a throttle valve position value corresponding to said control signal from said running characteristic in accordance with said detected demand value of vehicle travelling speed; and an actuator responsive to said control signal for controlling said throttle valve to maintain said vehicle at said demand travelling speed.

6. The apparatus as claimed in claim 5, wherein said control circuit includes means for calculating a deviation between the demand and actual values of vehicle travelling speed, means for calculating said value corresponding to said control signal as a function of said calculated deviation, said function being derived from said determined running characteristic, thereby zeroing said deviation.

7. The apparatus as claimed in claim 5, wherein said control circuit includes means for determining constants K1 and K2 from said determined running characteristic, means for calculating a deviation of $\Delta V$ between the demand and actual values of vehicle travelling speed, and means for calculates said value corresponding to said control signal as $K1 \times (\Delta V + K2 \int \Delta V \, dt)$.

8. The apparatus as claimed in claim 5, wherein said control circuit includes means for generating a set signal, means responsive to said set signal for sampling an actual value of vehicle travelling speed, and means for setting said vehicle travelling speed demand value at said actual value sampled substantially upon generation of said set signal.

* * * * *